(12) United States Patent
Chen

(10) Patent No.: US 6,860,489 B2
(45) Date of Patent: Mar. 1, 2005

(54) CHUCK DEVICE

(76) Inventor: Tsai-Ching Chen, No. 202, Lane 330, Sec. 7, Chang Lu Road, Pu Hsing Hsiang, Chang Hua Hsien (TW)

( * ) Notice: Subject to any disclaimer, the term of this patent is extended or adjusted under 35 U.S.C. 154(b) by 165 days.

(21) Appl. No.: 10/403,370

(22) Filed: Mar. 31, 2003

(65) Prior Publication Data

US 2004/0188959 A1 Sep. 30, 2004

(51) Int. Cl.$^7$ .............................. B23B 31/107
(52) U.S. Cl. .................................. 279/82; 279/906
(58) Field of Search ................... 279/23.1, 79, 80, 279/82, 906

(56) References Cited

U.S. PATENT DOCUMENTS

| | | | | |
|---|---|---|---|---|
| 1,138,465 A | * | 5/1915 | Fegley et al. | 279/82 |
| 1,653,762 A | * | 12/1927 | Fegley et al. | 279/82 |
| 6,053,675 A | * | 4/2000 | Holland et al. | 408/239 R |
| 2003/0230862 A1 | * | 12/2003 | Peters et al. | 279/82 |

FOREIGN PATENT DOCUMENTS

TW 326734 * 2/1998 .......... B25B/15/00

* cited by examiner

*Primary Examiner*—Daniel W. Howell
*Assistant Examiner*—Michael W. Talbot
(74) *Attorney, Agent, or Firm*—Alan D. Kamrath; Nikolai & Mersereau, P.A.

(57) ABSTRACT

A chuck includes a socket, an elastic detent and a sleeve. The socket includes a hole defined axially therein, an upper slot cut therein and a lower slot cut therein. The elastic detent includes an upper transverse section and a lower transverse section. The elastic detent is mounted on the socket so that the upper transverse section of the elastic detent enters the hole through the upper slot and that the lower transverse section of the elastic detent enters the hole through the lower slot. The sleeve includes an annular flange formed on an internal face. The sleeve can be moved on the socket so that the annular flange can move the upper and lower transverse sections from the hole along the upper and lower slots, respectively.

6 Claims, 4 Drawing Sheets

CHUCK DEVICE

BACKGROUND OF INVENTION

1. Field of Invention

The present invention relates to a chuck device.

2. Related Prior Art

Taiwanese Patent Publication No. 326734 discloses a chuck including a socket 10, springs 20 and 30, a sleeve 40 and a ring 50. The socket 10 includes a first section 11 and a second section 12 extending from the first section 11. The first section 11 of the socket 10 includes a hole 111 defined axially therein and a slot 112 cut through a periphery thereof and communicated with the hole 111. The spring 20 is inserted in the hole 111 of the first section 11 of the socket 10. The ring 50 includes an internal edge and an internal edge. The internal edge of the ring 50 is fit in a groove defined in the periphery of the first section 11 of the socket 10. The spring 30 is mounted on the first section 11 of the socket 10 and the ring 50. The spring 30 is a helical element extending about an axis. The spring 30 includes a transverse section 31 extending transverse to the axis. The transverse section 31 of the spring 30 is put movably into the hole 111 through the slot 112. The sleeve 40 includes upper and lower flanges both formed on an internal face. A groove 45 is defined in the internal face of the sleeve 40 next to the lower flange. The sleeve 40 is mounted on the first section 11 of the socket 10, the lower flange of the sleeve 40 is forced beyond the ring 50 so that the groove 45 receives the external edge of the ring 50, thus retaining the sleeve 40 on the first section 11 of the socket 10. In use, a tool bit is inserted in the hole 111. A groove defined in the tool bit receives the transverse section 31 of the spring 31 in order to retain the tool bit in the hole 111. In operation, the tool bit tends to rattle in the hole 111, and this however tends to disengage the transverse section 31 of the spring 31 from the groove defined in the tool bit, thus disengaging the tool bit from the hole 111. This could seriously hurt a person using the chuck.

The present invention is therefore intended to obviate or at least alleviate the problems encountered in prior art.

SUMMARY OF INVENTION

It is the primary objective of the present invention to provide a structurally simple and secure chuck.

According to the present invention, a chuck includes a socket, an elastic detent and a sleeve. The socket includes a hole defined axially therein, an upper slot cut therein and a lower slot cut therein. The elastic detent includes an upper transverse section and a lower transverse section. The elastic detent is mounted on the socket so that the upper transverse section of the elastic detent enters the hole through the upper slot and that the lower transverse section of the elastic detent enters the hole through the lower slot. The sleeve includes an annular flange formed on an internal face. The sleeve can be moved on the socket so that the annular flange can move the upper and lower transverse sections from the hole along the upper and lower slots, respectively.

Other objects, advantages, and novel features of the invention will become more apparent from the following detailed description when taken in conjunction with the attached drawings.

BRIEF DESCRIPTION OF DRAWINGS

The present invention will be described through detailed illustration of embodiments referring to the attached drawings wherein.

DETAILED DESCRIPTION OF PREFERRED EMBODIMENT

Figure 1:
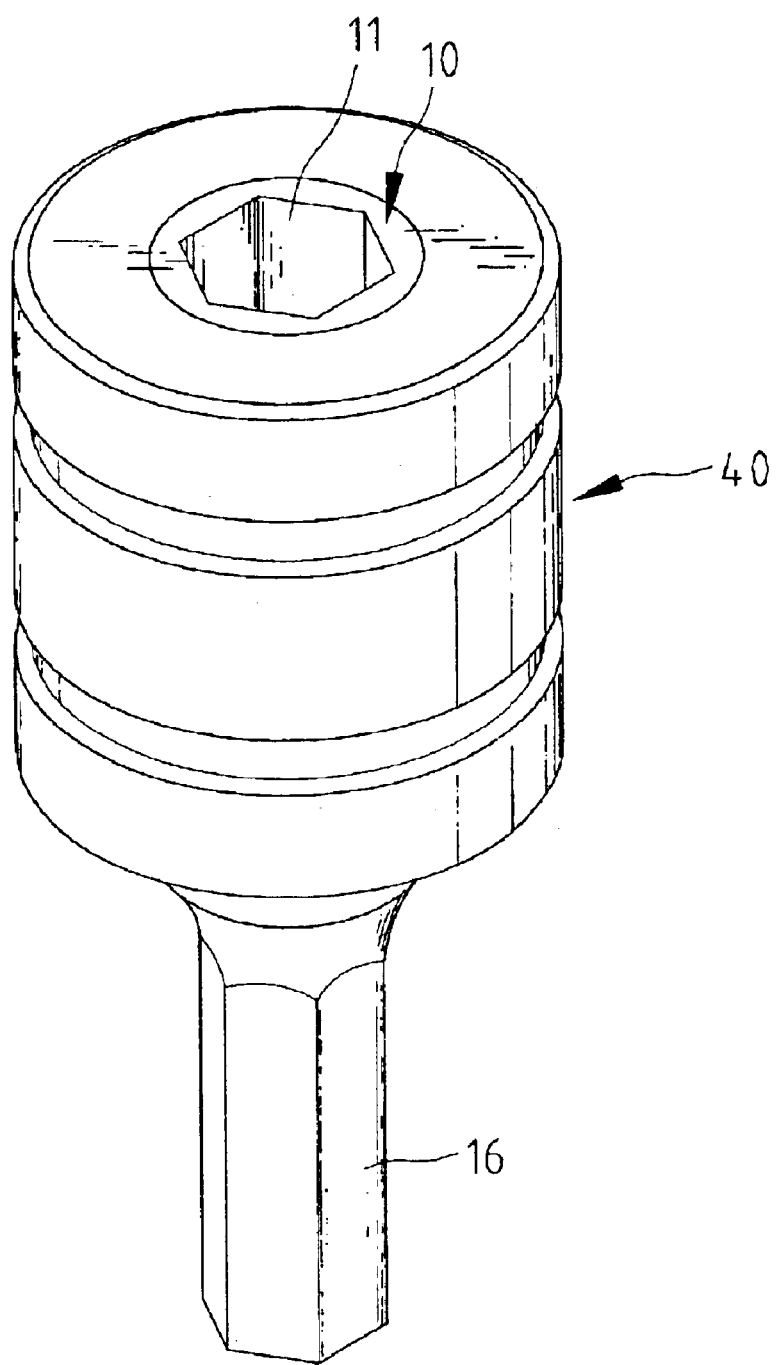
FIG. 1 is a perspective view of a chuck according to the preferred embodiment of the present invention.
Figure 2:
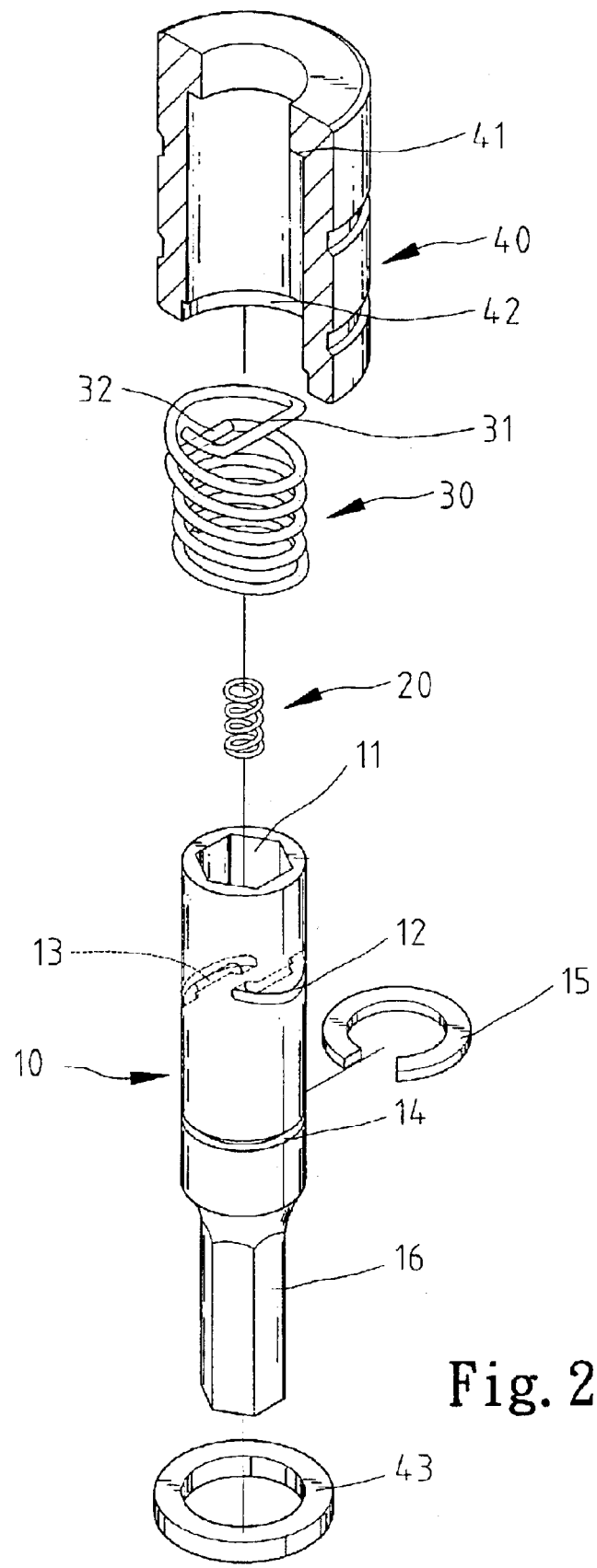
FIG. 2 is an exploded view of the chuck shown in FIG. 1.

Referring to FIGS. 1 and 2, according to the preferred embodiment of the present invention, a chuck includes a socket 10, an insert 16, a spring 20, an elastic detent 30, a sleeve 40 and a ring 50.

The socket 10 is formed with an open end and a closed end. The socket 10 includes a hole 11 defined axially therein through the open end and upper and lower slots 12 and 13 both cut through a periphery thereof and communicated with the hole 11. An annular groove 14 is defined in an external face of the socket 10. A C-clip 15 is fit in the annular groove 14.

The insert 16 extends from the closed end of the first section 11. The insert 16 is for non-rotational insertion into a portion of a driving device, electric or pneumatic (not shown) so that the chuck can be driven by means of the driving device.

The spring 20 is inserted in the hole 11 of the socket 10.

The elastic detent 30 is mounted on the socket 10 and the C-clip 15. The elastic detent 30 is a helical spring extending about an axis and including upper and lower transverse sections 31 and 32 both extending transverse to the axis. The upper transverse section 31 of the elastic detent 30 is put movably into the hole 11 through the upper slot 12. The lower transverse section 32 of the elastic detent 30 is put movably into the hole 11 through the lower slot 13.

The sleeve 40 includes an annular flange 41 formed on an internal face at an upper end and an annular recess 42 defined in the internal face at a lower end. The sleeve 40 is mounted on the socket 10. A ring 43 is fit in the annular recess 42 and abutted against the C-clip 15, thus retaining the sleeve 40 on the socket 10.

Figures 3, 4:
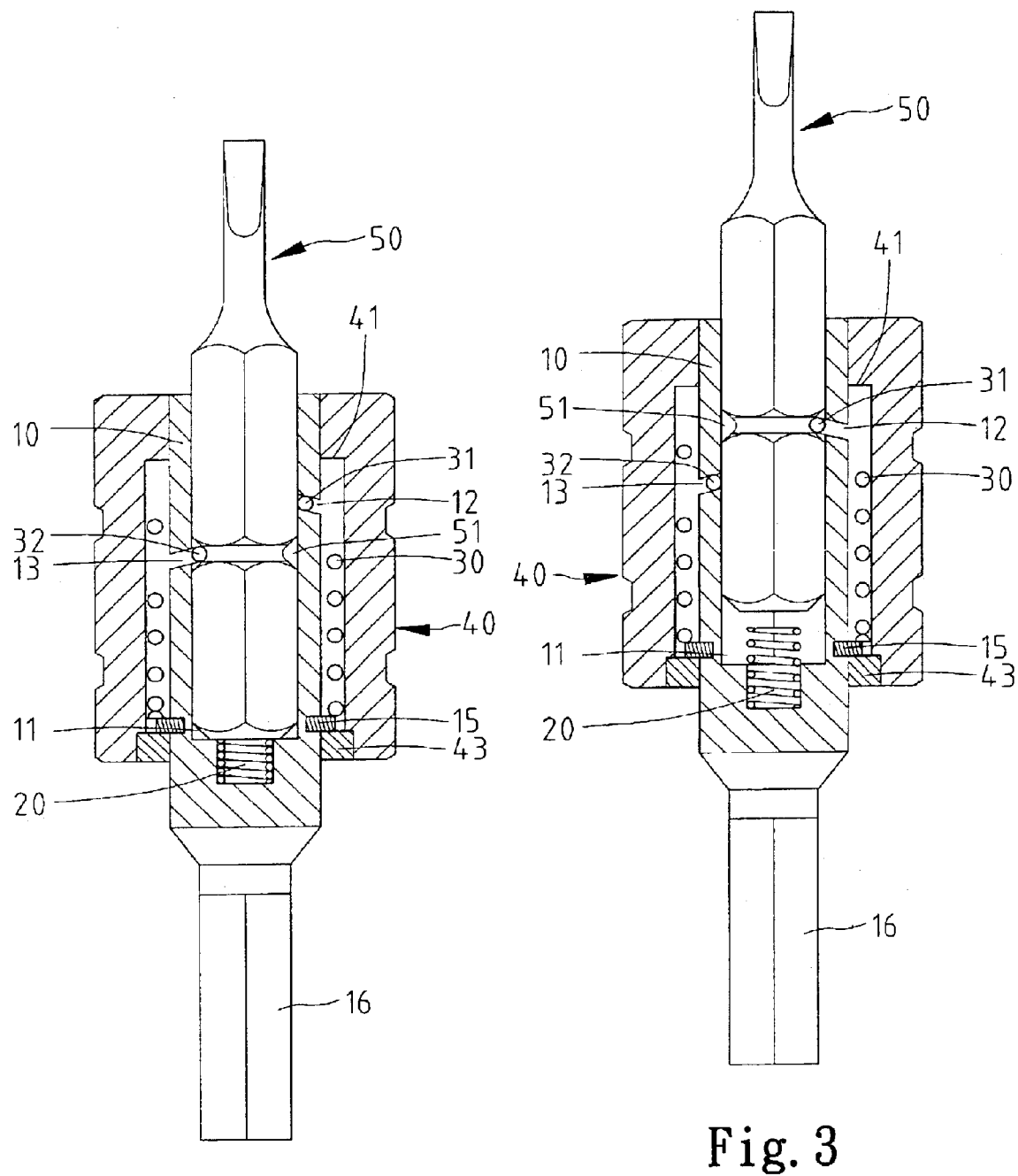
FIG. 3 is a cross-sectional view of a tool bit during insertion into the chuck shown in FIG. 1.
FIG. 4 is similar to FIG. 3 but showing the tool bit in a different position during the insertion into the chuck.

Referring to FIG. 3, a tool bit 50 is inserted into the hole 11. An annular groove 51 defined in the tool bit 50 receives the upper transverse section 31 of the spring 31 in order to retain the tool bit 50 in the hole 11.

Referring to FIG. 4, the tool bit 50 is inserted further into the hole 11. The annular groove 51 receives the lower transverse section 32 of the spring 31 in order to retain the tool bit 50 in the hole 11.

The tool bit 50 is pinched by means of the upper and lower transverse sections 31 and 32 of the elastic detent 30. The tool bit 50 will still be firmly pinched by means of the upper and lower transverse sections 31 and 32 of the elastic detent 30 even if the tool bit 50 shakes in the hole 11 for tolerance in fabricating. That is, the annular groove 51 of the tool bit 50 will still receive the upper transverse section 31 or the lower transverse section 32 of the elastic detent 30. Therefore, the tool bit 50 is retained firmly in the chuck.

Figure 5:
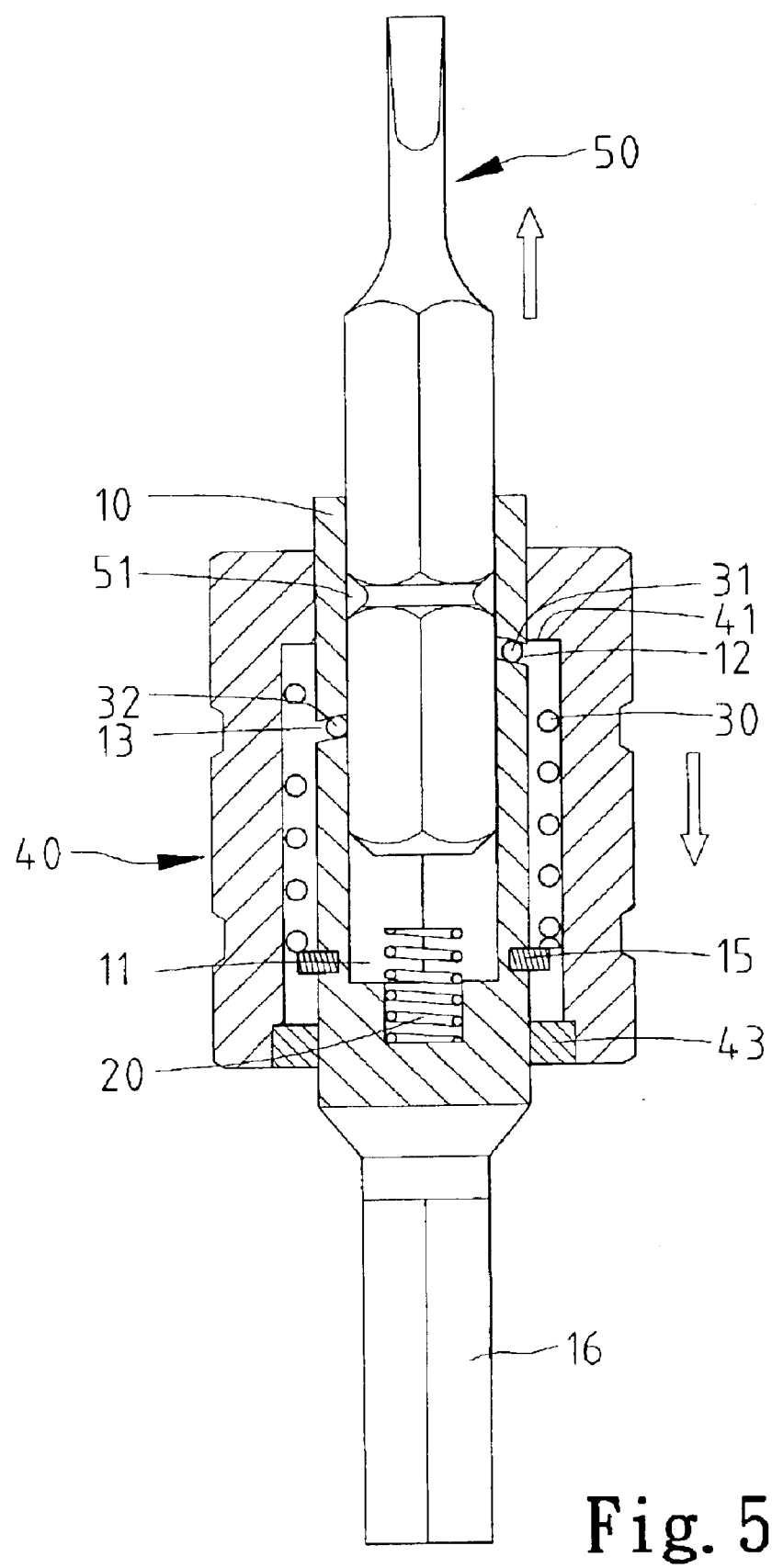
FIG. 5 is like FIG. 3 but showing the tool bit during removal from the chuck.

Referring to FIG. 5, the sleeve 40 is moved on the socket 10 so that the annular flange 41 moves the upper and lower transverse sections 31 and 32 of the elastic detent 30 from the hole 10 along upper and lower slots 12 and 13, respectively. That is, the upper and lower transverse sections 31 and 32 of the elastic detent 30 are both kept from the annular groove 51 of the tool bit 50. The tool bit 50 can be removed from the chuck, and the spring 20 functions to this end.

The present invention has been described through detailed illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A chuck including:
   a socket including a hole defined axially therein, an upper slot cut therein and a lower slot cut therein;
   a elastic detent including an upper transverse section and a lower transverse section, wherein the elastic detent is mounted on the socket so that the upper transverse section of the elastic detent enters the hole through the upper slot and that the lower transverse section of the elastic detent enters the hole through the lower slot; and
   a sleeve including an annular flange formed on an internal face, wherein the sleeve can be moved on the socket so that the annular flange can move the upper and lower transverse sections from the hole along the upper and lower slots, respectively.

2. The chuck according to claim 1 further including a C-clip mounted on the socket and a ring fit in the sleeve for abutment against the C-clip in order to retain the sleeve on the socket.

3. The chuck according to claim 2 wherein the socket includes an annular groove defined in an external face of the socket for receiving the C-clip.

4. The chuck according to claim 1 further including an insert extending from the first section.

5. The chuck according to claim 1 further including a spring inserted in the hole of the socket.

6. The chuck according to claim 1 wherein the sleeve includes an annular recess defined in an internal face for receiving the C-clip.

\* \* \* \* \*